(12) United States Patent
Koto

(10) Patent No.: US 7,970,055 B2
(45) Date of Patent: Jun. 28, 2011

(54) METHOD AND APPARATUS FOR COMPRESSING IMAGE DATA

(75) Inventor: Haruhiro Koto, Tokorozawa (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 1415 days.

(21) Appl. No.: 11/438,434

(22) Filed: May 23, 2006

(65) Prior Publication Data

US 2006/0274830 A1 Dec. 7, 2006

(30) Foreign Application Priority Data

May 24, 2005 (JP) ................................. 2005-150779

(51) Int. Cl.
*H04N 7/12* (2006.01)
*H04N 11/02* (2006.01)

(52) U.S. Cl. ............................... 375/240.03; 375/240.22

(58) Field of Classification Search . 375/240.01–240.29
See application file for complete search history.

(56) References Cited

U.S. PATENT DOCUMENTS

| 5,745,178 A | * | 4/1998 | Hartung et al. | .......... 375/240.04 |
| 5,969,764 A | * | 10/1999 | Sun et al. | ................. 375/240.06 |
| 6,023,296 A | * | 2/2000 | Lee et al. | ................. 375/240.05 |
| 7,688,890 B2 | * | 3/2010 | Kondo et al. | ............. 375/240.03 |

* cited by examiner

*Primary Examiner* — David Czekaj
(74) *Attorney, Agent, or Firm* — Brundidge & Stanger, P.C.

(57) ABSTRACT

There is provided an image data compression apparatus capable of effectively suppressing an image data volume after compression processing. A bit rate value is detected according to the image data volume after the compression processing. According to the bit rate size value detected, a quantization step size value used in the compression processing is modified. According to the quantization step size value, a skip frame number is set and a frame skip of the image data before or after the compression processing is performed according to the number of frame skip frames which has been set.

4 Claims, 7 Drawing Sheets

METHOD AND APPARATUS FOR COMPRESSING IMAGE DATA

INCORPORATION BY REFERENCE

The present application claims priority from Japanese application JP2005-150779 filed on May 24, 2005, the content of which is hereby incorporated by reference into this application.

BACKGROUND OF THE INVENTION

The present invention relates to an apparatus and a method for compressing image data and in particular, to an image data compression apparatus and method capable of effectively suppressing an image data volume after the compression processing.

In a conventional moving image compressing apparatus, control of a generated code volume has been performed by increase/decrease of a quantization step size value (hereinafter, referred to as a Q-value) inputted to an image compression unit and by a frame skip.

It should be noted that the aforementioned conventional technique has been described, assuming that its inventor is already known but no appropriate document has been found and no conventional technique document information is described here.

SUMMARY OF THE INVENTION

Here, in the conventional moving image compression apparatus, sufficient study has not been performed on configuration for effectively performing control of a generated code volume.

It is therefore an object of the present invention to provide an image data compression apparatus capable of effectively suppressing an image data volume after the compression processing.

In order to achieve the aforementioned object, the image data compression apparatus according to the present invention includes a bit rate value detection unit for detecting a bit rate according to an image data volume after compression processing, a quantization step size value changing unit for changing a quantization step size value used in the compression processing according to the bit rate value detected, a skip frame number setting unit for setting a number of skip frames according to the quantization step size value, and a frame skip unit for performing a frame skip of the image data before or after the compression processing according to the number of skip frames which has been set.

Here, the detection of the bit rate value based on the image data volume after the compression processing may be performed, for example, based on by referencing the image data volume after compression processing of one frame or based on an average value obtained by referencing an image data volume after the compression processing of a plurality of frames.

Moreover, in order to achieve the aforementioned object, in the image data compression apparatus according to the present invention, the aforementioned frame skip is not started until the aforementioned quantization step size value exceeds a predetermined value.

As has been described above, in the image data compression apparatus according to the present invention, the bit rate value is detected according to the image data volume after the compression processing; the quantization step size value used in the compression processing is changed according to the detected bit rate; the number of skip frames is set according to the quantization step size value; and the frame skip of the image data before or after the compression processing is performed according to the number of skip frames which has been set. Thus, it is possible to effectively suppress the image data volume after the compression processing.

Other objects, features and advantages of the invention will become apparent from the following description of the embodiments of the invention taken in conjunction with the accompanying drawings.

DETAILED DESCRIPTION OF THE EMBODIMENTS

Description will now be directed to the embodiments of the present invention with reference to the attached drawings.

First Embodiment

Explanation will be given on the first embodiment of the present invention.

Figure 7:
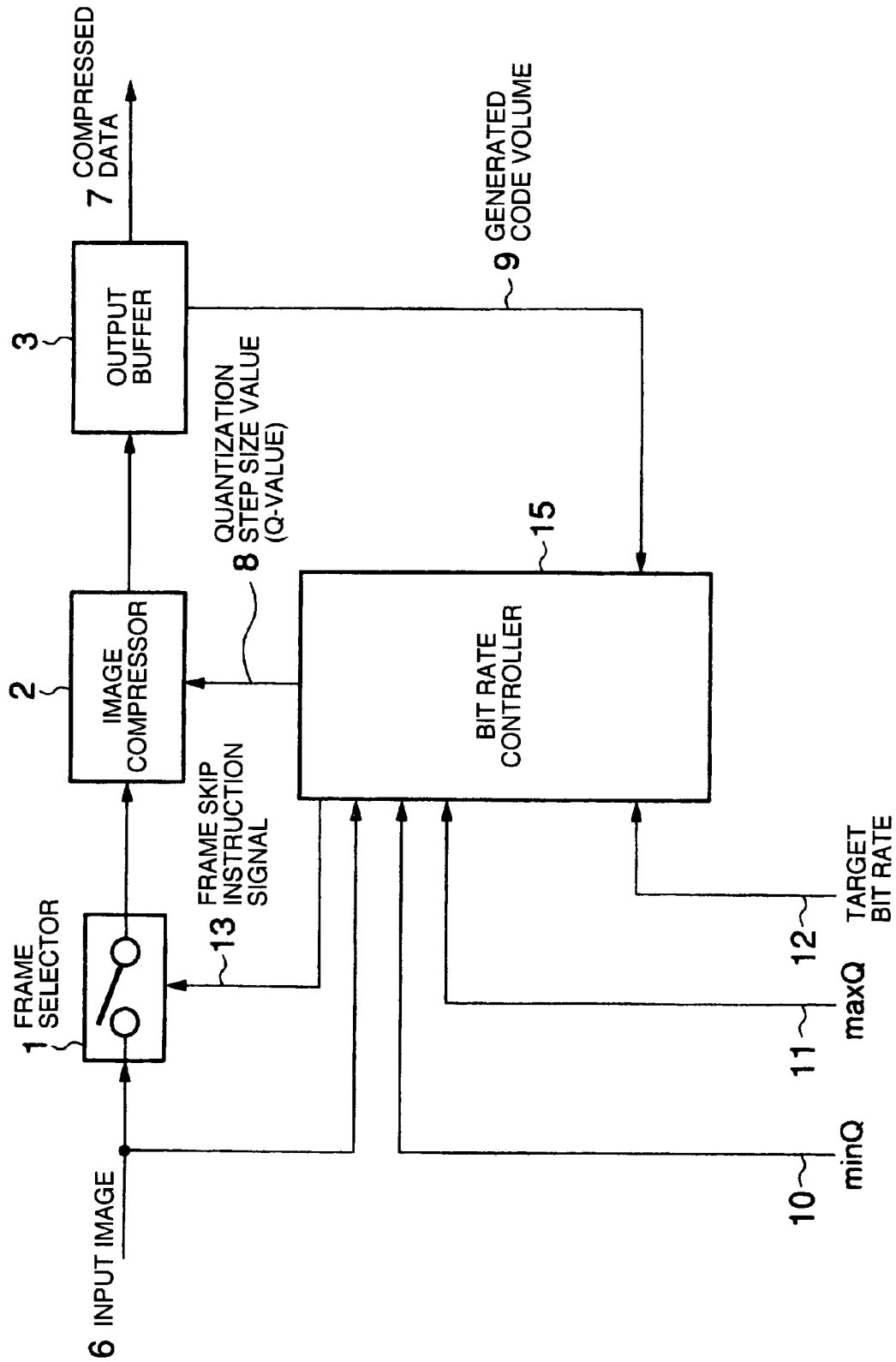
FIG. 7 is a block diagram showing a configuration example of the moving image compression apparatus according to an embodiment of the present invention.

FIG. 7 shows a moving image compression apparatus according to the embodiment of the present invention.

The moving image compression apparatus shown in FIG. 7 includes a frame selector 1, an image compressor 2, an output buffer 3, and a bit rate controller 15.

When a frame skip instruction signal 13 is inputted from the bit rate controller 15, the frame selector 1 performs a frame skip (frame discarding) of input image data 6. Otherwise, the frame selector 1 outputs the input image data 6 to the image compressor 2.

The image compressor 2 performs compression of the input image data 6 by a predetermined compression method such as the MPEG (Moving Picture Experts Group) method and the Motion-JPEG (Joint Photographic Experts Group) method and outputs the compressed data to the output buffer 3. Here, the compression processing by the image compressor 2 is performed according to a Q-value 8 specified by the bit rate controller 15.

The output buffer outputs the compressed data inputted from the image compressor 2 as compressed data 7 to outside of a network, for example. Moreover, the output buffer 3 outputs the generated code volume (image data volume after compression processing) 9 of the inputted compressed data to the bit rate controller 15.

According to the generated code volume 9 of the compressed data 7 which has been outputted from the image compressor 2 and stored in the output buffer 3, the bit rate controller 15 calculates an effective bit rate and monitors the calculated effective bit rate value.

Here, the effective bit rate value may be calculated by using various methods. For example, when input image data 6 of 20 fps (frames per second) is processed, an accumulated value of the data volume of the compressed image data of the past 60 frames which has been divided by 2 seconds is made the effective bit rate value. It should be noted that when a frame skip is performed, calculation is performed by assuming that the image data volume of the frame is 0.

The bit rate controller 15 monitors the effective bit rate value.

When the effective bit rate value has become greater than 90% of a preset target bit rate 12, the bit rate controller 15 increases the Q-value to be outputted to the image compressor 2 by one step. This reduces the code volume of the compressed data 7 outputted by the image compressor 2.

Moreover, when the effective bit rate value has become smaller than 50% of the target bit rate 12, the bit rate controller 15 decreases the Q-value by one step. This increases the code volume of the compressed data 7 outputted by the image compressor 2.

Here, the values 90% and 50% are only examples and various values may be applied.

Here, as the Q-value 8 increases, image quality is degraded. It should be noted that the minimum value and the maximum value of the Q-value 8 are limited by min Q 10 and min Q 11, respectively, which are preset values.

When the Q-value 8 increases and the effective bit rate value exceeds the target bit rate 12, it is preferable to prevent degradation of the image quality by further increase of the Q-value.

For this, the bit rate controller 15 outputs a frame skip instruction signal 13 to the frame selector 1, thereby performing a frame skip and performing control so that the input image data 6 will not be inputted to the image compressor 2. Since the generated code volume 9 is further decreased by the frame skip, the bit rate controller 15 can control the effective bit rate value to a code volume near the target bit rate 12.

Here, as compared to control of the Q-value 8, in control by the frame skip, the generated code volume 9 greatly increases and decreases. For this, when control by the frame skip is performed, a margin of the effective bit rate value for the target bit rate 12 becomes greater and the Q-value 8 may be maintained at a small value and degradation of the image quality may be suppressed. This phenomenon becomes especially remarkable when the value of the target bit rate 12 is small.

Accordingly, once a frame skip is performed, a code amount can have a sufficient margin even if the effective bit rate has reached the target bit rate 12.

In the moving image compression apparatus according to the present embodiment, compression is performed continuously over several frames and a frame skip is performed after that, and this procedure is repeated.

Second Embodiment

In the moving image compression, the generated code volume 9 is increased or decreased by the complexity of the input image. If the timing of frame skip depends on increase/decrease of the generated code volume 9, the next timing when the frame skip is performed is not constant. For this, in the motion of the moving image in the display device receiving the compressed data 7, a frame skip is caused at irregular intervals. This damages the smoothness of motion in the moving image display.

Accordingly, when more weight is given on the motion smoothness rather than the image quality, the second embodiment which will be explained below is also effective.

Explanation will be given on the second embodiment of the present invention.

Figure 1:
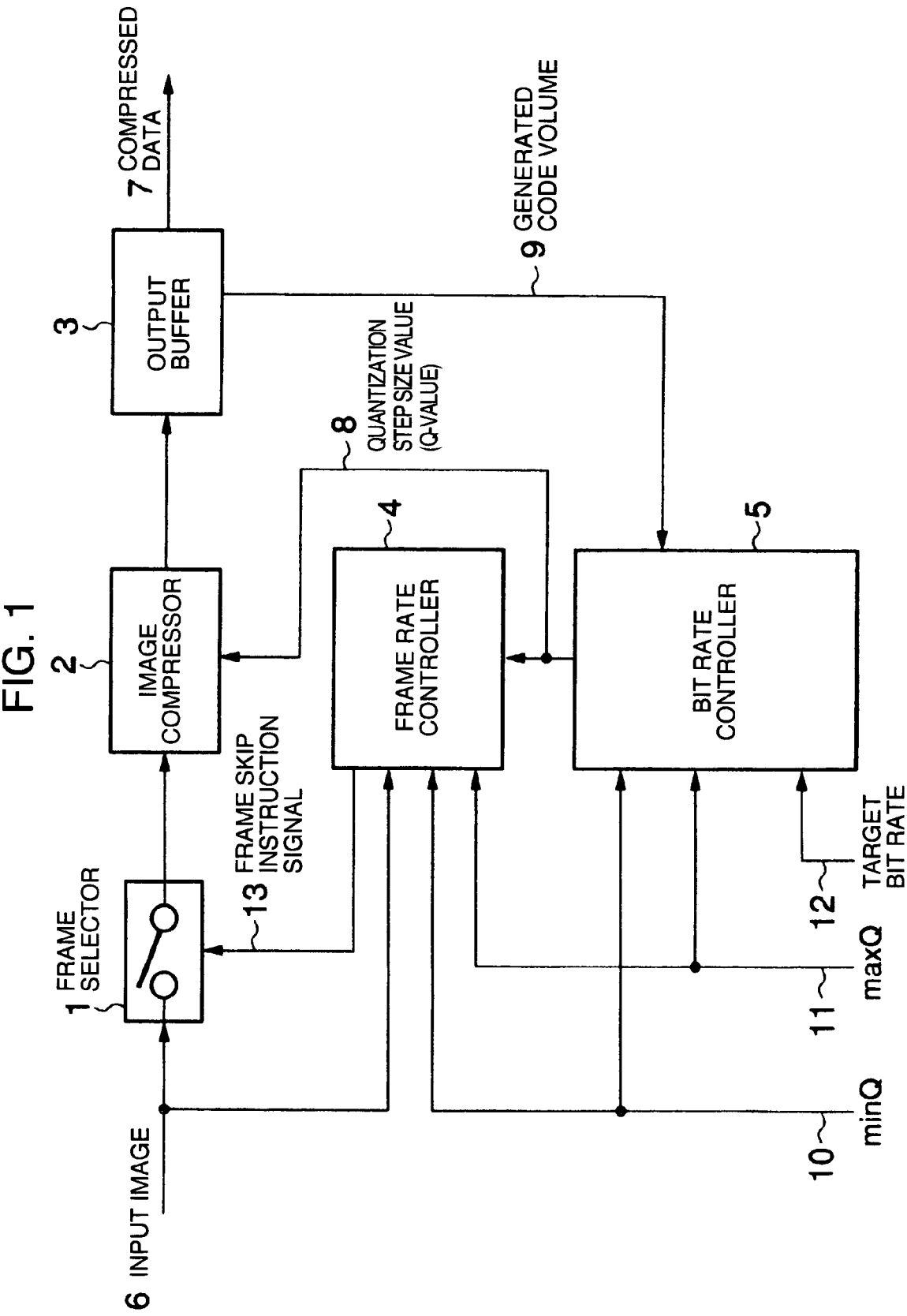
FIG. 1 is a block diagram showing a configuration example of a moving image compression apparatus according to an embodiment of the present invention.

FIG. 1 shows a configuration example of the moving image compression apparatus according to an embodiment of the present invention.

The moving image compression apparatus shown in FIG. 1 includes a frame selector 1, an image compressor 2, an output buffer 3, a frame rate controller 4, and a bit rate controller 5.

Here, in the moving picture compression apparatus in this embodiment, the frame rate controller 4 is further added as compared to the configuration shown in FIG. 7.

In the second embodiment, the frame rate controller 4 does not start a frame skip until the Q-value becomes the maxQ. Moreover, the frame rate controller 4 performs a frame skip not at irregular intervals but at a regular interval.

Configurations and operations of the other processing units 1-3 and 5 of the moving image compression apparatus are substantially identical to those of the moving image compression apparatus shown in FIG. 7.

In the configuration of FIG. 7, the frame skip instruction signal 13 is outputted from the bit rate controller 15. However, in the configuration of FIG. 1, the frame skip instruction signal 13 is outputted from the frame rate controller 4.

Moreover, the frame rate controller 4 inputs the input image data 6, the Q-value 8, the minQ 10, and the maxQ 11. The configuration and operation of the frame rate controller 4 will be detailed later.

Like the configuration shown in FIG. 7, the bit rate controller 5 calculates the effective bit rate value according to the generated code volume 9 and monitors the calculated effective bit rate value.

That is, the bit rate controller 5 compares the effective bit rate value to the target bit rate 12 and if the effective bit rate value has become greater than 90% of the predetermined target bit rate 12, the Q-value 8 outputted to the image compressor 2 is increased by one step. This reduces the code volume of the compressed data 7 outputted by the image compressor 2.

Moreover, if the effective bit rate value has becomes smaller than 50% of the target bit rate 12, the bit rate controller 5 decreases the Q-value 8 by one step.

Here, the values 90% and 50% are only examples and various other values may be employed.

Here, if the generated code volume 9 is great, i.e., when the effective bit rate value is great, the bit rate controller 5 increases the Q-value 8 and decreases the generated code volume 9.

However, since the frame skip is not started until the Q-value has become maximum by the operation of the frame rate controller 4 which will be detailed later, if the reduction of the generated code volume 9 is insufficient, the bit rate controller 5 increases the Q-value 8 up to the maxQ 11 in order to decrease the generated code volume 9.

If the Q-value 8 exceeds maxQ 11, the frame rate controller 4 outputs the frame skip instruction signal 13 to the frame selector 1. Thus, one frame of the input image 1 is skipped.

This frame skip instruction signal 13 is different from the configuration shown in FIG. 7 and control is performed as follows. The number of frames to be skipped is decided and according to the decided number of frames to be skipped, the frame skip is performed at a regular interval.

Moreover, if the effective bit rate value has become smaller than, for example, 50% of the target bit rate 12 and the Q-value 8 has become smaller than the value decided according to the minQ 10 (minQ 10×K), the frame rate controller 4 reduces the number of frames to be skipped. Here, K≧1.

Figure 2:
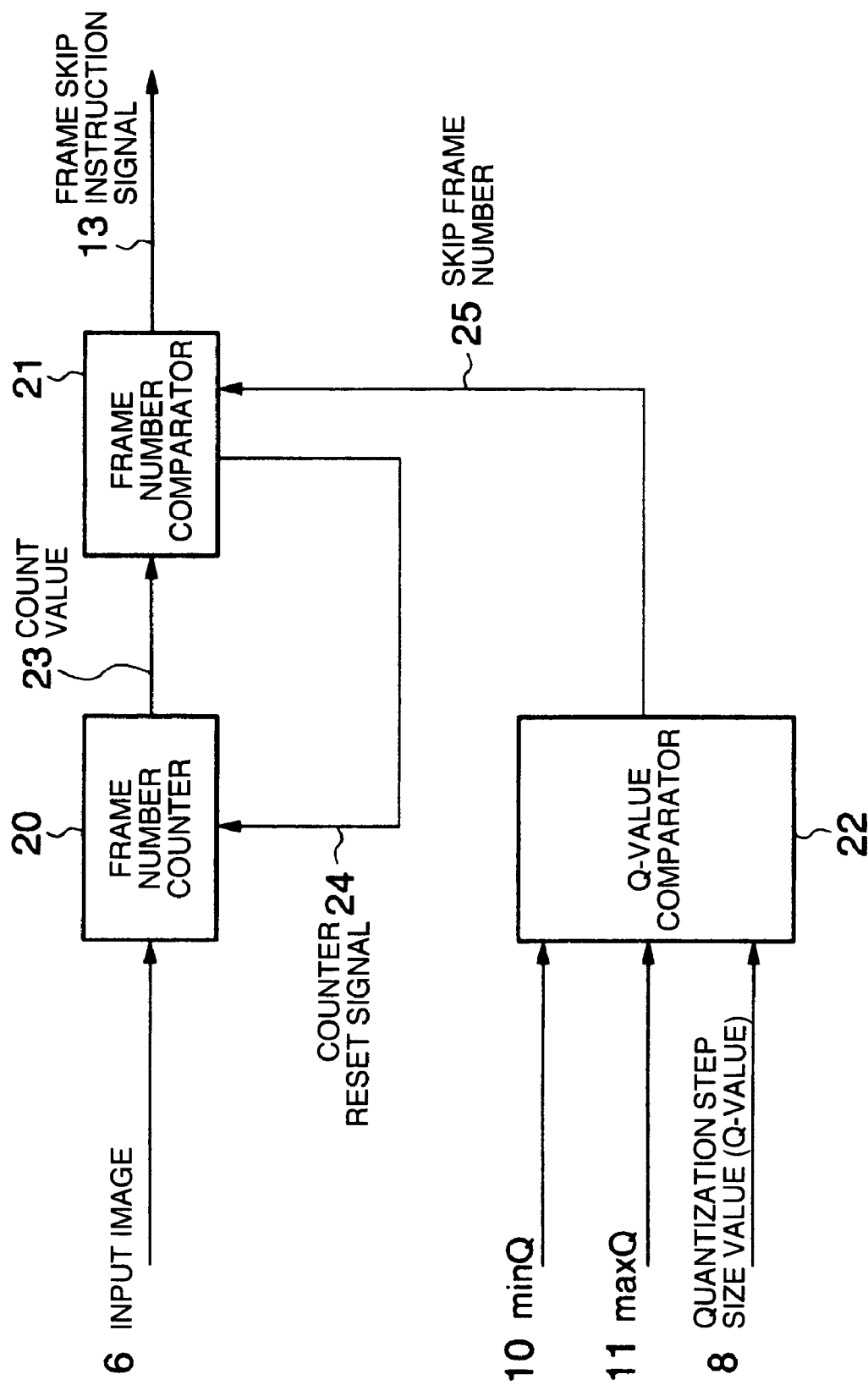
FIG. 2 is a block diagram showing a configuration example of a frame rate controller according to an embodiment of the present invention.

FIG. 2 shows a configuration example of the frame rate controller 4 according to the embodiment of the present invention.

The frame controller 4 shown in FIG. 2 is formed by a frame number counter 20, a frame number comparator 21, and a Q-value comparator 22.

The frame number counter 20 is incremented by one such as 0, 1, 2, . . . each time input image data 6 is inputted and outputs the counter value 23 to the frame number comparator 21.

The Q-value comparator 22 compares the Q-value 8 to the minQ 10×K and maxQ 11, calculates the number of frames to be skipped, and outputs the calculated number as the skip frame number 25 to the frame number comparator 21. This operation will be detailed later.

It should be noted that in this embodiment, the skip frame number means a value indicating the number of frames of image data to be skipped after compressing one frame of image data. However, the definition of the skip frame number is not to be limited to this. Various definitions are applicable. For example, a value is applicable which may indicate the number of frames during which one image data skip is performed.

The frame number comparator 21 compares the skip frame number 25 inputted from the Q-value comparator 22 to the counter value 23 inputted from the frame number counter 20. If the values are different, the frame number comparator 21 outputs the frame skip instruction signal 13 to the frame selector 1.

On the other hand, if the values are identical, the frame number comparator 21 stops output of the frame skip instruction signal 13, acquires one frame of the input image 1, and further outputs a counter reset signal 24 to the frame number counter 20 so as to reset the counter value of the frame number counter 20.

Explanation will be given on the case when the skip frame number 25 is 2, for example, in the configuration shown in FIG. 2. In this case, the frame number comparator 21 outputs the frame skip instruction signal 13 at the timing when the count value 23 is 0 and 1 and outputs the counter reset signal 24 instead of the frame skip instruction signal 13 at the timing when the count value 23 is 2. Accordingly, the frame number counter 20 repeats counting: 0, 1, 2, 0, 1, 2, . . . .

Figure 3:
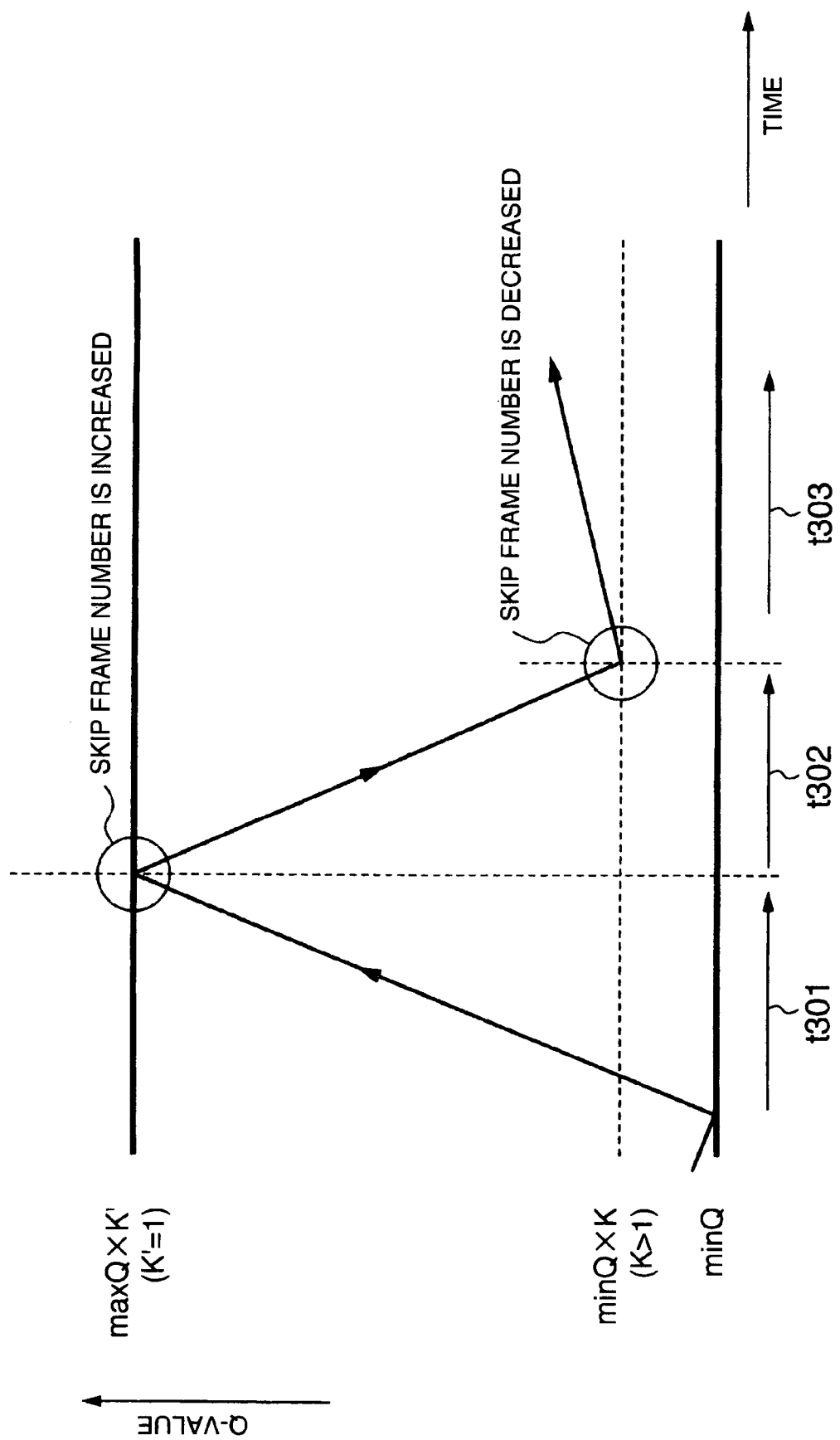
FIG. 3 shows the processing performed by a Q-value comparison unit according to an embodiment of the present invention.

Next, explanation will be given on the operation of the Q-value comparator 22 with reference to FIG. 3, As shown in FIG. 3, firstly, the Q-value 8 increases from a small value (that is, the generated code volume is large) and when the Q-value 8 has reached maxQ 11, the Q-value comparator 22 increments the skip frame number 25 by 1 (t301). For example, suppose the skip frame number 25 has an initial value 0 and no one frame has been skipped, the skip frame number 25 becomes from 0 to 1. It should be noted that the increment value may be other values than 1.

Next, as shown in FIG. 3, after the Q-value has become as large as maxQ 11 and the frame rate controller has increased the skip frame number 25, the generated code volume decreases and the effective bit rate value becomes smaller. Thus, the code volume for the target bit rate can have a sufficient margin and the Q-value 8 becomes smaller by the operation of the aforementioned bit rate controller 5 (t302).

When the Q-value has becomes as small as the value of minQ 10 multiplied by K (K≧1), the Q-value comparator 22 decreases the skip frame number 25 by 1. Thus, the number of skips is reduced and the generated code volume is increased. Accordingly, the Q-value is increased by the operation of the aforementioned bit rate controller 5 (t303).

Here, the Q-value is compared to the value of minQ 10 multiplied by K instead of the minQ 10 because the skip frame number 25 need be decreased as quickly as possible without waiting for that the Q-value 8 becomes minQ 10. However, the value of K may be set at an arbitrary value according to the requirement of the system implementation.

Furthermore, it is possible to set the value of maxQ 10 multiplied by K' (K'≦1) as a threshold value and the skip frame number 25 is increased soon without waiting for that the Q-value 8 reaches maxQ 10.

Thus, when the generated code volume has no sufficient margin, the Q-value 8 comparator 22 performs control by increasing the skip frame number 25 and decreasing the generated code volume 9 when the Q-value 8 has become greatest. Moreover, when the generated code volume has a sufficient margin and the Q-value 8 has decreased to a predetermined value, the Q-value comparator 22 performs control by decreasing the skip frame number 25 and increasing the generated code volume 9.

Figure 4:
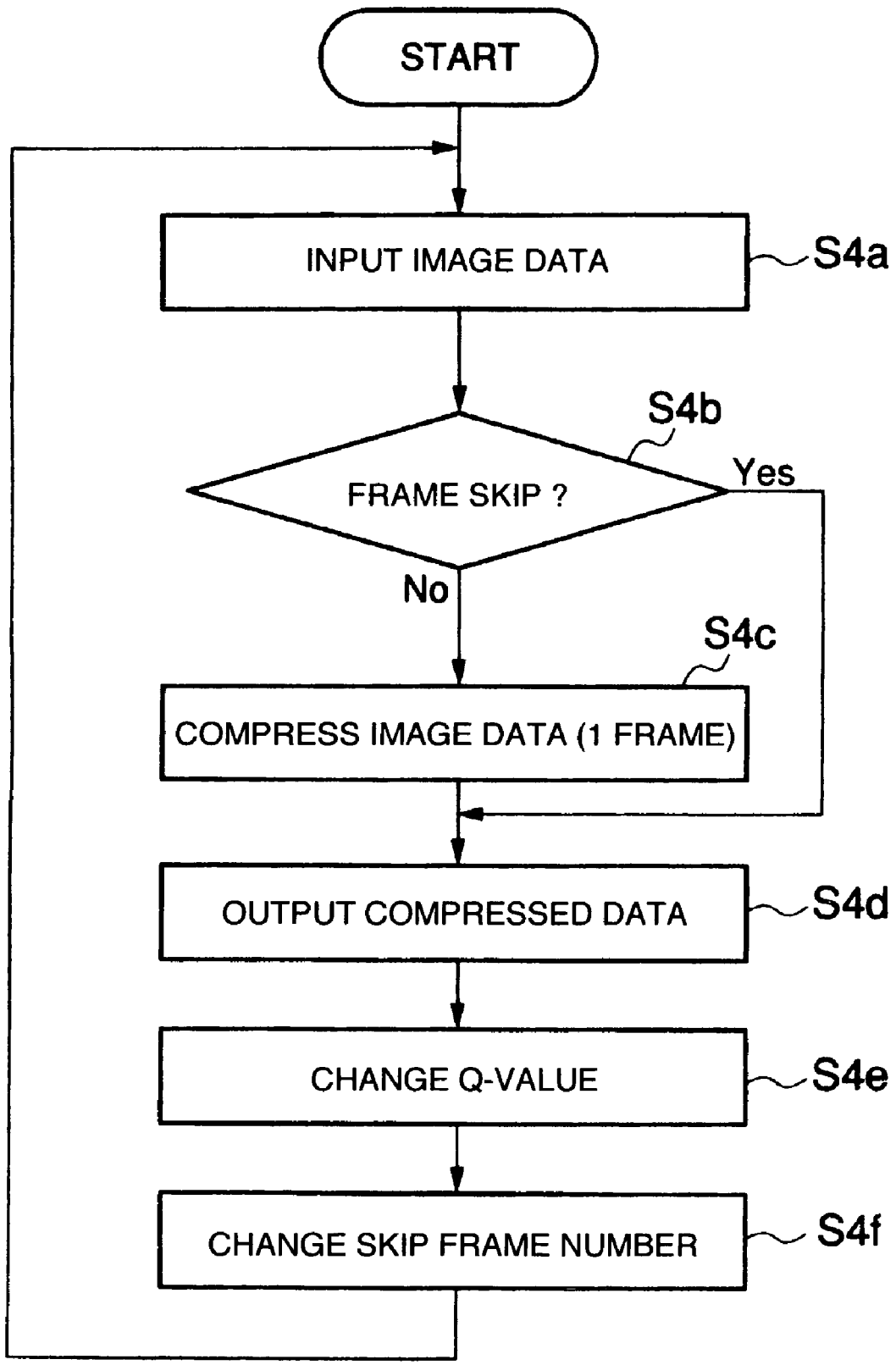
FIG. 4 is a flowchart showing an example of processing procedure of the moving image compression apparatus according to an embodiment of the present invention.

Next, explanation will be given on an example of processing procedure of the moving image compression apparatus according to the embodiment of the present invention with reference to FIG. 4.

Firstly, image data is inputted (step S4a).

Next, it is decided whether to skip (discard) the image data of the current frame according to the skip frame number 25 (step S4b). As has been described above by referring to FIG. 2, when the counter value 23 and the skip frame number 25 are compared and are not identical, the frame number comparator 21 outputs the frame skip instruction signal 13 so that the frame selector 1 performs a frame skip.

When no frame skip is performed (No in step S4b), the image compression unit 2 subjects image data of the current frame to compression processing (step S4c).

Next, the output buffer 3 outputs image data after being compressed to outside (step S4d). Simultaneously with this, the generated code volume 9 is outputted from the output buffer 3 to the bit rate controller 5.

When a frame skip is performed (Yes in step S4b), the processing proceeds to step S4d. It should be noted that in step S4d when the frame skip has been performed, no image data compressed is outputted and only the generated code volume 9 which is 0 is outputted.

Next, the bit rate controller 5 calculates the effective bit rate value according to the generated code volume 9. According to comparison between the calculated effective bit rate value and the target bit rate, the Q-value 8 is changed (step S4e). It should be noted that the Q-value 8 changed is outputted to the image compressor 2 and the frame rate controller 4.

Figure 5:
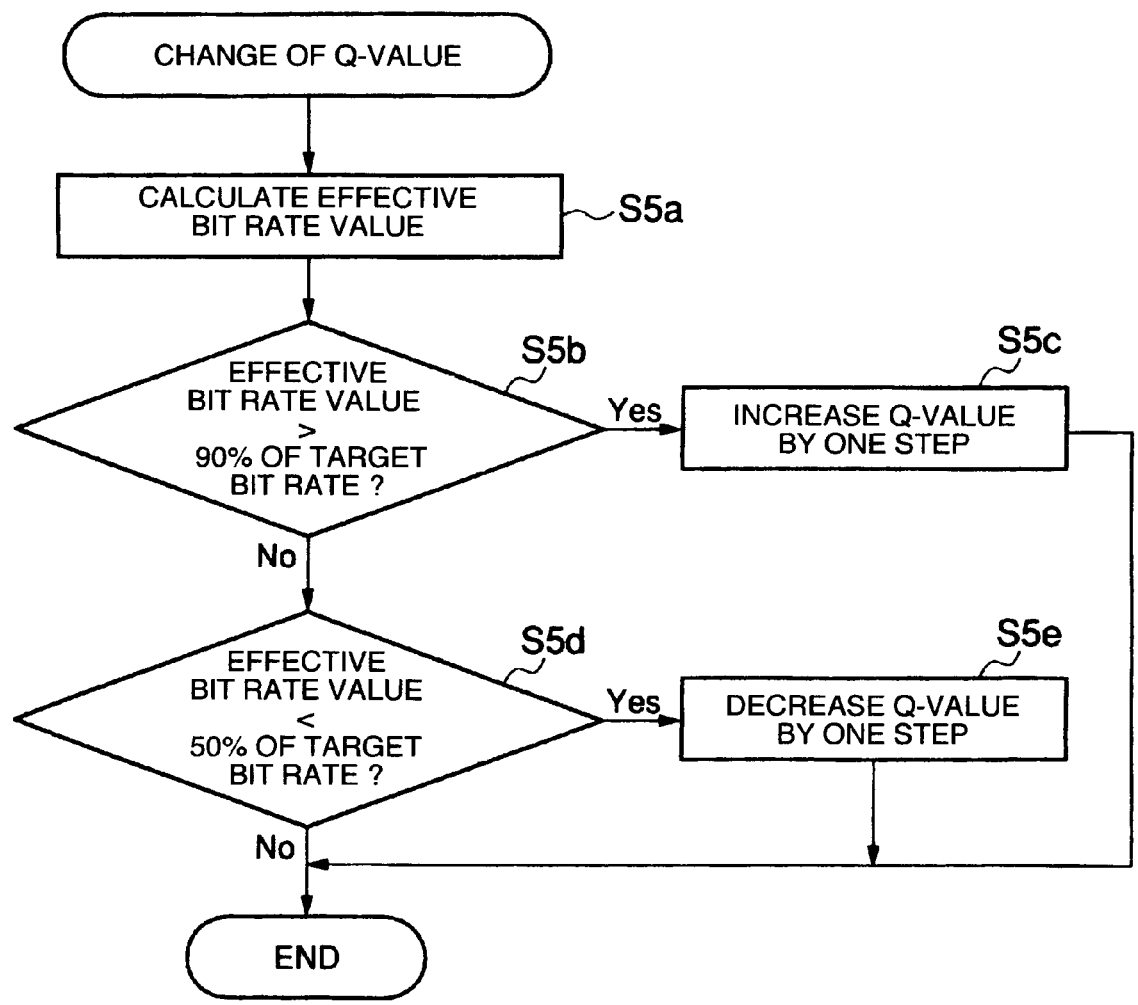
FIG. 5 is a flowchart showing an example of the Q-value changing processing procedure according to an embodiment of the present invention.

Here, FIG. 5 shows an example of procedure of changing of the Q-value 8 (step S4e) according to the embodiment of the present invention.

Firstly, the bit rate controller 5 calculates the effective bit rate value according to the generated code volume 9 (step S5a).

Next, it is determined whether the effective bit rate value has become greater than 90% of the target bit rate 12 (step S5b). If the effective bit rate value has become greater than 90% (Yes in step S5b), the Q-value 8 is increased by one step (step S5c) and the processing of step S4e is terminated. On the other hand, if the effective bit rate value is not greater than 90% (No in step S5b), the processing proceeds to step S5d.

Next, it is determined whether the effective bit rate value has become smaller than 50% of the target bit rate 12 (step S5d). If the value has become smaller than 50% (Yes in step S5d), the Q-value 8 is decreased by one step (step S5e), and the processing is terminated. On the other hand, if the value is equal to or greater than 50% (No in step S5d), the processing of step 4e is terminated as it is.

Next, explanation will be given on the processing procedure shown in FIG. 4. After the changing of the Q-value 8 (step S4e), the Q-value comparator 22 of the frame rate controller 4 changes the skip frame number 25 according to the current Q-value 8 (step S4f).

Figure 6:
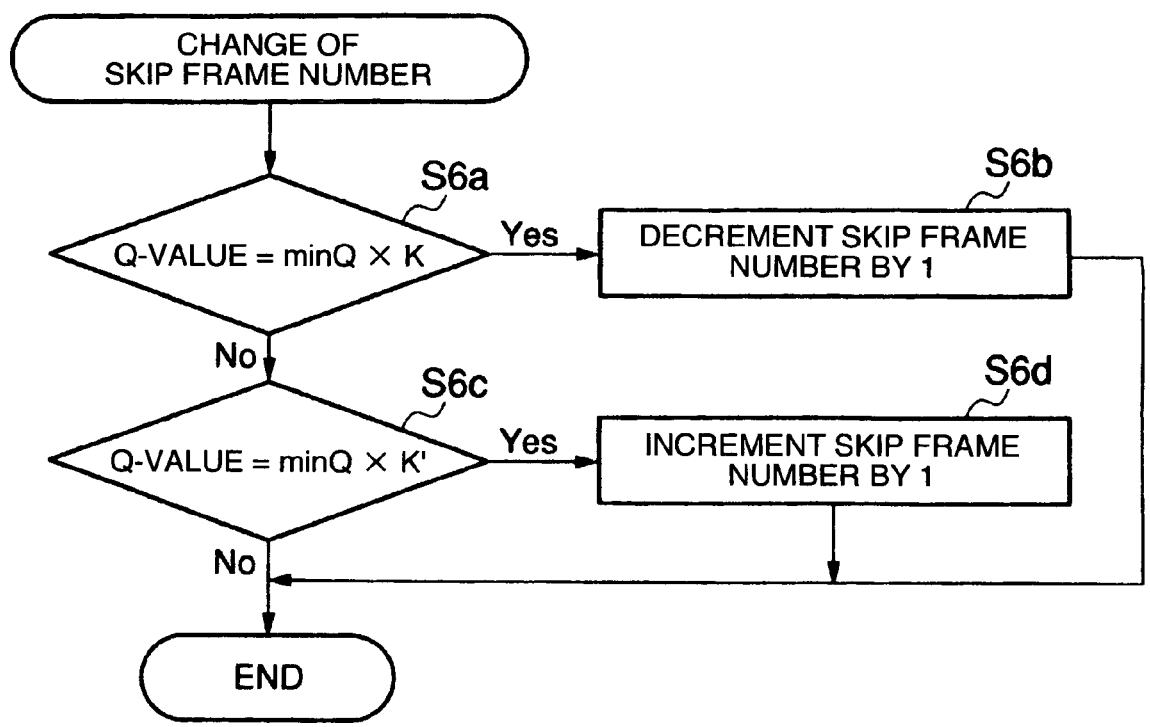
FIG. 6 is a flowchart showing an example of a procedure for changing the number of skip frames according to an embodiment of the present invention.

Here, FIG. 6 shows an example of procedure of the changing processing of the skip frame number 25 (step S4f) according to the embodiment of the present invention.

Firstly, the Q-value comparator 22 of the frame rate controller 4 determines whether the Q-value is equal to or smaller than the value of minQ 10 multiplied by K (minQ×K) (step S6a). If the value is equal to or smaller than (minQ×K) (Yes in step S6a), the skip frame number 25 is decremented by 1 (step S6b) and the processing of step S4f is terminated. If the value is greater than (minQ×K) (No in step S6a), the processing proceeds to step S6c.

Next, it is determined whether the Q-value is equal to or greater than the value of maxQ 11 multiplied by K' (maxQ× K') (step S6c). If the value is equal to or greater than (maxQ× K') (Yes in step S6c), the skip frame number 25 is incremented by 1 (step S6d) and the processing of step S4f is terminated. On the other hand, if the value is smaller than (maxQ×K') (No in step S6c), the processing of step S4f is terminated as it is.

Here, $K \geq 1$ and $K' \leq 1$. FIG. 3 shows an example of $K>1$ and $K'=1$.

As has been described above, in the moving image compression apparatus according to the present embodiment, the frame skip is not started until the Q-value 8 has reached the maximum value maxQ 11. Moreover, the frame skip is not performed at irregular intervals but at regular intervals, thereby maintaining the smoothness of the moving image display.

Here, in the moving image compression apparatus of the present embodiment, the frame selector 1 does not output image data to the compressor 2 so as to skip the image data before being compressed and discard the image data before being compressed. As another configuration example, it is also possible to arrange the function of the frame selector 1 between the compressor 2 and the output buffer 3. As for the image data on the frame to be skipped, the image data after being compressed and outputted from the compressor 2 is discarded.

It should be noted that in the moving image compression apparatus according to the present invention, the bit rate value detector is configured to the function of the output buffer 3 and the bit rate controller 5, the quantization step size value changing unit is configured to the function of the bit rate control unit 5, the skip frame number setting unit is configured to the function of the frame rate unit 4, and the frame skip unit is configured to the function of the frame selector and the frame rate controller.

Here, the moving image compression apparatus according to the present invention is not to be limited to the aforementioned configuration but may employ various configurations. For example, it may be configured as an independent apparatus of the image data compression apparatus or configured as one of the functions of an image transmission apparatus (Web encoder), a Web camera, and the like.

Moreover, it is also possible to constitute a system including a device (such as a display device) for processing data outputted from the image data compression apparatus although no explanation has been given on this in the embodiment.

Moreover, the present invention may be provided as a method or a technique for executing the processing relating to the present invention or a program for realizing the method and the technique or a recording medium for recording the program. Moreover, the present invention may also be provided as various devices and systems.

Moreover, the application field of the present invention is not to be limited to the aforementioned fields. The present invention may be applied to various fields.

Moreover, various processes performed in the moving image compression apparatus and the like according to the present invention may be performed, for example, in hardware resources having a processor, a memory, and the like and controlled by a processor which executes a control program stored in a ROM (Read Only Memory). Moreover, each of the functions for executing the processes may be configured as independent hardware circuits.

Moreover, the present invention may also be grasped as a computer-readable recording medium such as a floppy (registered trade mark) disc and a CD (Compact Disc)-ROM or the program (itself). By inputting the control program from the recording medium into the computer so as to be executed by the processor, it is possible to execute the processes relating to the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image data compression apparatus for performing compression processing of image data, comprising:
   a bit rate value detection unit for detecting an effective bit rate based on an image data volume after compression processing;
   a quantization step size value changing unit for inputting a a-target bit rate and a maximum value and a minimum value of a quantization step value used in the compression processing,
   wherein the quantization step value is increased by one step size between the maximum value and the minimum value is then output if the detected effective bit rate is higher than a first predetermined ratio of the target bit rate, and
   wherein the quantization step value is decreased by one step size between the maximum value and the minimum value and is then output if the detected effective bit rate is lower than a second predetermined ratio of the target bit rate;
   a frame rate control unit for inputting the maximum value and the minimum value of the quantization step value,
   wherein a number of skip frame is set to be increased by one number if the output quantization step value is equal to the maximum value, and
   wherein the number of skip frame is set to be decreased by one number if the quantization step value is set to be decreased down to a value which is the minimum value multiplied by a predetermined coefficient which is equal to one or more; and a frame skip unit for performing a frame skip process which discards frames corresponding to the set number of skip frame after passing one frame of the image data in before or after the compression process, wherein the frame skip process is executed if the quantization step value is higher than the maximum value.

2. The image data compression apparatus according to claim 1, wherein the frame rate control unit includes:

a frame number counter for counting up the frame number in response to inputting an input image and output a counting value; and a frame number comparison unit for comparing the counting number and the skip frame number wherein if the counting number are matched with the skip frame number then a reset signal is outputted to the frame number counter and based on a result of the comparison step, a frame skip signal is output to the frame skip unit, wherein the quantized step value is controlled by the quantized step value change unit and the skip frame number is set by the frame rate control unit whenever the frame is input, and wherein the frame skip unit skips the frame based on whether or not the frame skip signal.

3. An image transmission system comprising:
the image compression apparatus according to claim 1; and
a display device for displaying the image data outputted from the image compression apparatus.

4. An image compression method in an image data compression apparatus, wherein said image compression method when implemented by said image compression apparatus causes said image compression apparatus to perform the steps of:

detecting an effective bit rate based on an image data volume after a compression, inputting target bit rate and a maximum value and a minimum value of a quantization step value used in the compression processing, wherein the quantization step value is increased by one step size between the maximum value and the minimum value is then output if the detected effective bit rate is higher than a first predetermined ratio of the target bit rate, and wherein the quantization step value is decreased by one step size between the maximum value and the minimum value and is then output if the detected effective bit rate is lower than a second predetermined ratio of the target bit rate;

inputting the maximum value and the minimum value of the quantization step value, wherein a number of skip frame is set to be increased by one number if the output quantization step value is equal to the maximum value, and wherein the number of skip frame is set to be decreased by one number if the quantization step value is set to be decreased down to a value which is the minimum value multiplied by a predetermined coefficient which is equal to one or more; and performing a frame skip process which discards frames corresponding to the set number of skip frame after passing one frame of the image data in before or after the compression process, wherein the frame skip process is executed if the quantization step value is higher than the maximum value.

* * * * *